US008284287B2

(12) United States Patent
Vogel et al.

(10) Patent No.: US 8,284,287 B2
(45) Date of Patent: Oct. 9, 2012

(54) IMAGE SENSOR AND METHOD FOR READING OUT PIXELS OF THE IMAGE SENSOR

(75) Inventors: Patrick Vogel, Paderborn (DE); Steffen Lehr, Villingen-Schwenningen (DE); Heinrich Schemmann, Villingen-Schwenningen (DE); Sabine Roth, Moenchweiler (DE); Petrus Gijsbertus Maria Centen, Goirle (NL); Jeroen Rotte, Breda (NL); Friedrich Heizmann, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 809 days.

(21) Appl. No.: 12/227,503

(22) PCT Filed: May 22, 2007

(86) PCT No.: PCT/EP2007/054966
§ 371 (c)(1),
(2), (4) Date: Nov. 19, 2008

(87) PCT Pub. No.: WO2007/135157
PCT Pub. Date: Nov. 29, 2007

(65) Prior Publication Data
US 2009/0174802 A1    Jul. 9, 2009

(30) Foreign Application Priority Data
May 22, 2006  (EP) .................................... 06300500
May 22, 2006  (EP) .................................... 06300501

(51) Int. Cl.
*H04N 5/335* (2011.01)

(52) U.S. Cl. ......................................................... 348/308
(58) Field of Classification Search .................. 348/308, 348/294, 241
See application file for complete search history.

(56) References Cited

U.S. PATENT DOCUMENTS

| 6,798,453 | B1 | 9/2004 | Kaifu |
| 684,739 | A1 | 1/2005 | Ang |
| 688,856 | A1 | 5/2005 | Neter |
| 7,068,319 | B2 * | 6/2006 | Barna et al. .................... 348/372 |
| 2002/0018600 | A1 | 2/2002 | Lyon et al. |
| 2003/0043089 | A1 | 3/2003 | Hanson et al. |
| 2003/0146991 | A1 | 8/2003 | Barna et al. |
| 2004/0174439 | A1 | 9/2004 | Upton |
| 2005/0083420 | A1 | 4/2005 | Koseki et al. |

(Continued)

FOREIGN PATENT DOCUMENTS
EP        0918434        5/1999
(Continued)

OTHER PUBLICATIONS

Search Report Dated Aug. 23, 2007.

*Primary Examiner* — Hung Dang
(74) *Attorney, Agent, or Firm* — Tutunjian & Bitetto, P.C.

(57) ABSTRACT

Image sensor, which comprises a plurality of pixels arranged as a pixel array with rows and columns and at least one read-out arrangement for reading out the pixels row by row. The columns are grouped into blocks with a certain number N of columns. Each read-out arrangement comprises N column read out circuits and an addressing circuit for with at least two groups of addressing lines for addressing the blocks. The blocks are selectively addressed by the groups of addressing lines in a way that a read-out sequence of blocks addressed by the groups is continuous across all blocks.

7 Claims, 13 Drawing Sheets

U.S. PATENT DOCUMENTS

2005/0174455 A1  8/2005  Elmakias et al.

FOREIGN PATENT DOCUMENTS

| | | |
|---|---|---|
| EP | 0 926 885 | 6/1999 |
| EP | 1566959 | 8/2005 |
| JP | 09-284656 | 10/1997 |
| JP | 11-150255 | 6/1999 |
| JP | 11-164204 | 6/1999 |
| JP | 11-196332 | 7/1999 |
| JP | 2002-077738 | 3/2002 |
| JP | 2005143078 | 6/2005 |

* cited by examiner

IMAGE SENSOR AND METHOD FOR READING OUT PIXELS OF THE IMAGE SENSOR

This application claims the benefit, under 35 U.S.C. §365 of International Application PCT/EP2007/054966, filed May 22, 2007, which was published in accordance with PCT Article 21(2) on Nov. 29, 2007 in English and which claims the benefit of European patent application No. 06300500.3, filed May 22, 2006 and European patent application No. 06300501.1, filed May 22, 2006.

BACKGROUND OF THE INVENTION

1. Field of the Invention

The invention relates to an image sensor, in particular to a CMOS image sensor, and methods for reading out pixels of the image sensor. CMOS image sensors used e.g. in digital cameras require a reading out of pixels with a high rate and a correction of defective pixels.

2. Description of the Prior Art

A common image sensor comprises a plurality of pixels arranged as a pixel array with rows and columns of pixels and a read-out arrangement for reading out the pixels row by row, wherein one column readout circuit is associated with each column of the pixel array. A large number of column readout circuits is needed.

An image sensor, which is used to produce an image representing an object, is described in the EP 1 450 554 A2. The image sensor comprises a pixel array with rows and columns of pixels and a read-out arrangement for reading out the pixels row by row, wherein the M columns, i.e. the M pixels of a row, are grouped into N blocks with M/N pixels. The read-out arrangement comprises a first group and a second group of column readout circuits. Each group has M/N column readout circuits. In operation, the first group of column readout circuits is reading and storing pixel signals from the pixels while the second group of column readout circuits is transferring out processed signal. Two groups of M/N column readout circuits are needed.

In addition, CMOS image sensors used in digital cameras are manufactured with standard processes as provided by leading technology vendors. Due to variances in process parameters, tolerances in mask sets etc. there is a certain probability that not all pixels on a large sensor array perform as specified. Some of them may deliver a permanent signal that corresponds to either dark or bright whereas the latter is the most annoying to viewers on a screen.

To sort out all devices with defective pixels is normally not an option due to the impact on IC costs. So in most cases the customer of an image sensor IC will accept devices from the fab having a certain number of defective pixels as long as the rest of the IC functionality is available as specified. Also during normal lifetime of the product one or more pixels may fail. In return measures have to be taken to compensate for the adverse visible effects of damaged pixels on a screen. Common methods are filtering algorithms that try to adapt the content of the damaged pixel to the surrounding area.

The filtering algorithms are used for the readout data in the digital domain. In U.S. Pat. No. 7,009,644 B1 an intelligent host is provided for the algorithms in order to correct anomalous pixels. Methods described in U.S. Pat. No. 6,665,009 B1 and US 2005/0030394 B1 use additional circuits arranged on the imager chip for the correction.

SUMMARY OF THE INVENTION

It is desirable to improve reading out pixels of an image sensor. It is also desirable to provide an image sensor and a method for reading out pixels of the image sensor, which need as less circuits as possible. It is yet also desirable to provide a method for reading out the image sensor with an improved correction of defective pixels.

The invention suggests an image sensor as claimed in claim 1 and methods as claimed in the claims 4 and 7. Advantageous developments and embodiments of the invention are presented in the dependent claims.

According to the invention, an image sensor comprises a plurality of pixels arranged as a pixel array with rows and columns and at least one read-out arrangement for reading out the pixels row by row. The columns are grouped into blocks with a certain number P of columns, i.e. P pixels in each row. Each read-out arrangement comprises P column read out circuits and an addressing circuit with at least two groups of addressing lines for addressing the blocks. The blocks are selectively addressed by the groups of addressing lines in a way that a read-out sequence of blocks addressed by the different groups is continuous across all blocks.

By selectively addressing the blocks by the groups, a first column of a next block can be addressed by one group while a posterior column of an earlier block is addressed by another group. As a result, the addressing of the next block, e.g. the reading out of the columns of the next block, can begin while the earlier block is addressed, e.g. while the column read out signals of the earlier block are transferred.

The blocks are addressed by the groups in a continuous repeated sequence, i.e. a read-out sequence of blocks addressed by the groups is continuous across all blocks. The pixels of a row can be read out continuously due to the different groups of addressing lines without needing two groups of column readout circuits.

Preferably, two groups of addressing lines are provided and alternatively connected to inner blocks, which are blocks with pixels used for the image. Preferably for a very high number of pixels, two read-out arrangements are provided.

Preferably, border blocks at the left or right side of the pixel array are provided with addressing lines of all groups, wherein in case an inner block is skipped the groups of the addressing lines are selected in such a way that the read-out sequence is continuous across all blocks. Every region of inner blocks can be selected by skipping blocks. The groups for addressing the border blocks are selected in order to complete the read-out sequence of the inner blocks.

Preferably, the P column read out circuits are connected to one analogue-to-digital converter via a multiplexing stage, wherein the multiplexing stage and the analogue-to-digital converter are connected to a common clock line. As a result, they are controlled by a common clock signal. Preferably, the multiplexing stage comprises a P stage shift register with P analogue switches.

According to the invention, in a method for reading out pixels of an image sensor at least a part of the pixels arranged as a pixel array with rows and columns are read out row by row with a read-out arrangement. In particular, columns of the blocks each with P columns are read out by P column read out circuits, wherein at least two groups of blocks are selectively addressed by corresponding groups of addressing signals in a way that a read-out sequence of the blocks addressed by the groups is continuous across all blocks.

Preferably, border blocks at the left or right side of the pixel array are selectively addressed by selected groups of all groups of addressing signals, wherein in case an inner block is skipped the groups are selected in such a way that the read-out sequence is continuous across all blocks.

Preferably, column read out signals are send to one analogue-to-digital converter via a multiplexing stage, wherein the multiplexing stage and the analogue-to-digital converter are controlled by a common clock signal.

According to the invention, in a method for reading out pixels of an imager sensor pixels arranged as a pixel array with rows and columns are read out row by row with a read-out arrangement, wherein columns of blocks are read out by column read out circuits and defective pixels are corrected. In particular, a column read out signal with a value provided by a defective pixel is replaced by a predetermined value while reading out the columns by the column read out circuits. The value of the defective pixels is replaced in the analogue domain.

According to the invention leaking pixels, which would show up as a bright pixel on a dark image, are removed by a predetermined value, preferably by a black pixel. The benefit to do this replacement on the imager in the analogue domain is, that this correction is easier and simpler, than with digital post processing. The digital post processing correction will have problems, if the leaking pixel smears out. The correction possibility also allows to reach higher imager IC yield, because a higher defect density can be tolerated by the customer. The disturbing visual effect caused by a defective bright pixel from an image sensor is removed.

According to the invention, the signal coming from a defective pixel is replaced by a predetermined value, preferably a value corresponding to black, in the analogue part of the image sensor. By replacing signals corresponding to defective pixels directly at the source of the problem, i.e. directly on the image sensor chip, before entering the digital signal processing in a subsequent digital image processing stage the processing in the digital domain is freed from performing this task. Adverse visual effects of defective pixels on a screen are compensated for.

If the correction of leaking pixels were made in the digital domain in a post processing step smearing may occur due to limited bandwidth when performing analogue or digital filtering. This smearing increases the visibility of the defective pixel.

As an alternative, a method for reading out pixels of an image sensor combines a method, wherein the blocks are selectively addressed by two different groups of addressing lines with a method with a replacing of a value of a defective pixel with a predetermined value in the analogue domain.

Preferably, a control signal in synchronism with the addressing signals selects between reading the actual value from the pixel or replacing the value by the predetermined value.

As a result, replacement of defective pixels can be activated by the dedicated control signal. The dedicated control signal can for example be a switching signal supplied to a pin on the imager chip.

BRIEF DESCRIPTION OF THE DRAWINGS

The invention will be explained in more detail using two embodiments, wherein a first embodiment is illustrated in the FIGS. 1 to 10 and a second embodiment is illustrated in the FIGS. 11, 12, 13 and 14a and 14b.

It shows.

DETAILED DESCRIPTION OF THE INVENTION

An image sensor of a first embodiment of the invention is illustrated in the FIGS. 1 to 10. According to the invention the image sensor and a corresponding method for reading out pixels of the image sensor use a specific logic described in the following.

Figure 1:
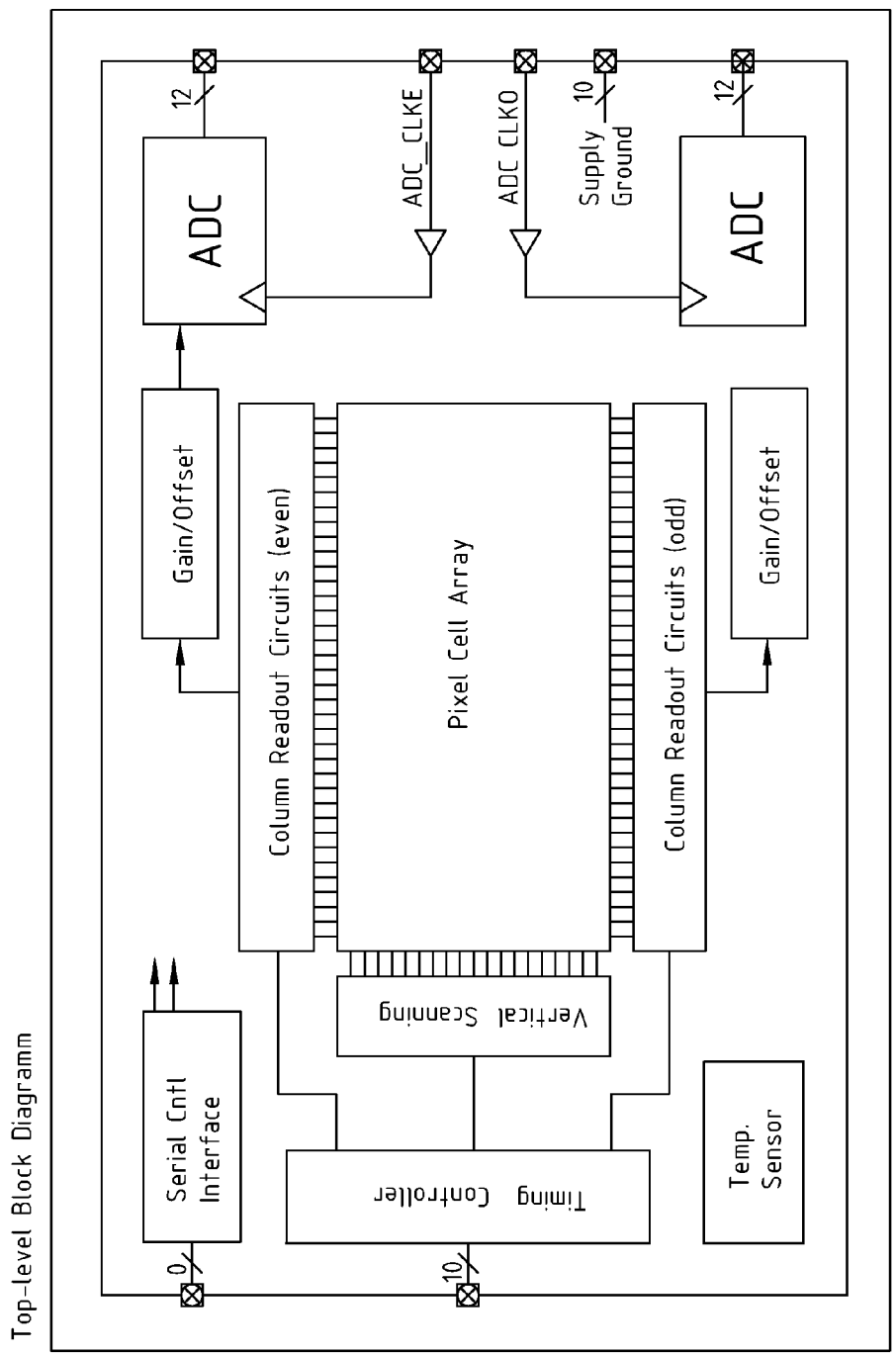
FIG. 1 an exemplary block diagram an image sensor of a first embodiment of the invention.

The image sensor shown in FIG. 1 comprises a plurality of pixels arranged as a pixel array with rows and columns, two read-out arrangements for reading out the pixels row by row and a timing controller. The addressable pixel range of this image sensor comprises, for example, a pixel array with 1148 rows and 2048 columns. A circuit with the two read-out arrangements described here is used to read pixel information out of a row of the array that has been selected beforehand by another circuit.

For read out, the columns are partitioned into columns with even and odd numbers. The even-numbered columns are led through at the top of the pixel array while the odd-numbered columns are led through at the bottom of the pixel array. Therefore the readout logic, i.e. the read-out arrangement, is implemented twice at the IC top level, as shown in FIG. 1. The readout process is accomplished in parallel for the both groups of columns, i.e. for the even-numbered columns and for the odd-numbered columns, so both instances of the read-out logic share only one set of registers to program the different operation modes.

Figure 2:
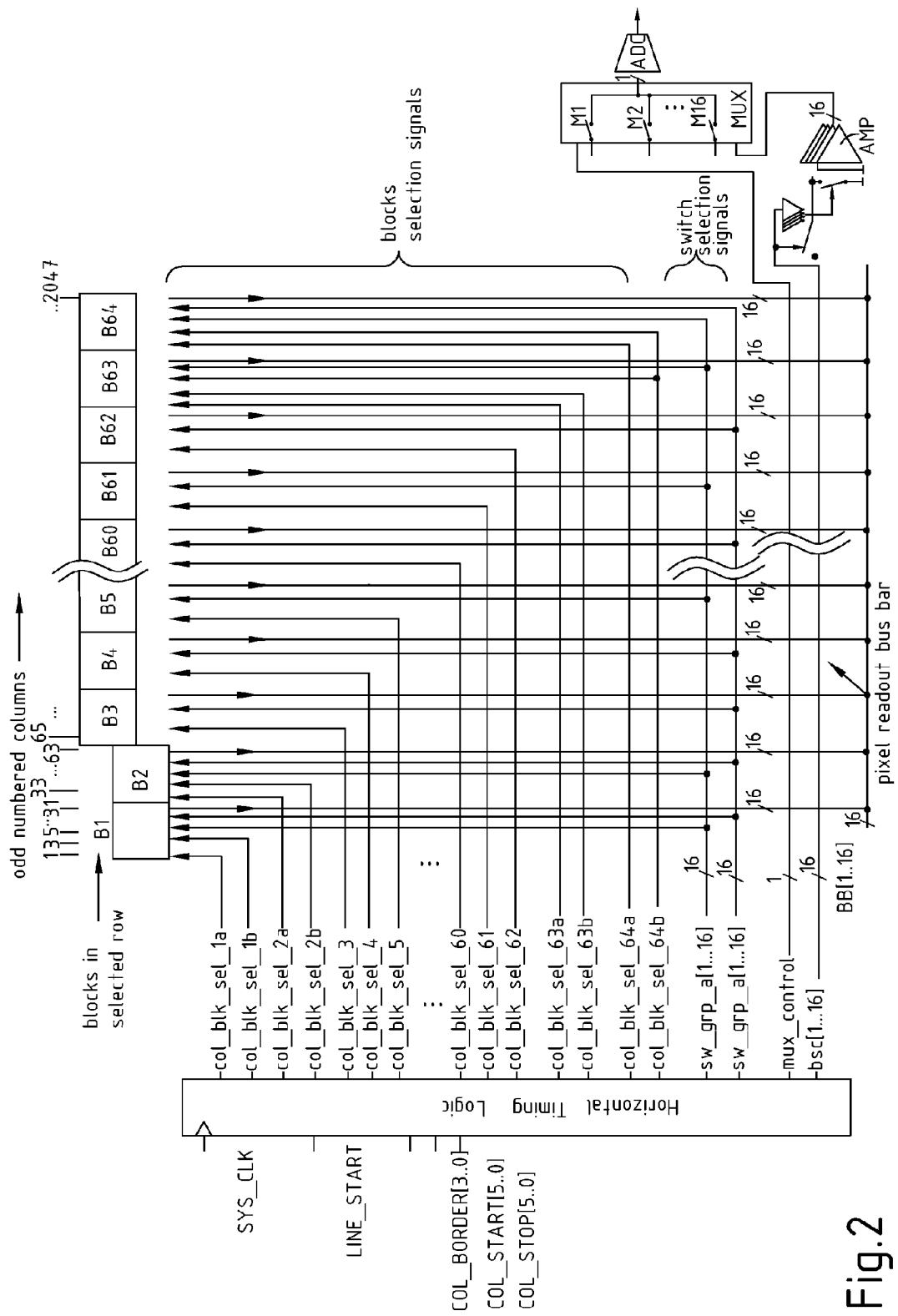
FIG. 2 an exemplary block diagram of a read-out arrangement.

The block diagram FIG. 2 shows one of the read-out arrangements, also mentioned as system architecture, at the bottom of the pixel array and the timing controller. The read-out arrangement comprises column readout circuits for the odd column and one analogue-to-digital converter ADC.

The columns are grouped into blocks with a certain number P of columns. In particular, the 1024 odd-numbered columns are grouped into 64 blocks B1 . . . B64 each of which combines 16 columns. The read-out arrangement comprises P, in particular 16, column read out circuits and an addressing circuit with two groups of addressing lines for addressing the blocks. One group of addressing lines is generated as a bus sw_grp_a[1 . . . 16] for column select signals with corresponding lines col_blk_sel_xx for block select signals and the other group of addressing lines is generated as a bus sw_grp_b[1 . . . 16] for column select signals with corresponding lines col_blk_sel_xx for block select signals. The symbols, such as sw_grp_a [1 . . . 16], are used for the lines and buses and also for the signals itself.

A specific column XX is selected by the horizontal timing logic, i.e. the timing controller, by means of a block select signal from the line col_blk_sel_xx together with a column select signal coming either from bus sw_grp_a[1 . . . 16] or from bus sw_grp_b[1 . . . 16]. As can be seen from the block diagram, inner blocks with odd numbers are connected to bus sw_grp_a[1 . . . 16] while blocks with even numbers are connected to bus sw_grp_b[1 . . . 16].

The blocks B1 ... B64 are selectively addressed by the two groups of addressing lines. The inner blocks B4 ... B62 with odd numbers are connected to the bus sw_grp_a[1 ... 16] and the inner blocks B3 ... B61 with even number are connected to the bus sw_grp_b[1 ... 16]. The inner blocks B3 ... B62 are alternatively connected and addressed by the two groups of addressing lines.

According to the invention, in a method for reading out pixels of an image sensor a part of the pixels, e.g. the odd-numbered pixels, are read out row by row with the read-out arrangement. The P columns of the blocks are read out by the P column read out circuits, wherein the two groups of blocks, i.e. the odd-numbered inner blocks and the even-numbered inner blocks, are alternatively addressed by the two groups of addressing lines.

As a result, a read-out sequence of the blocks is continuous across all inner blocks B3 ... B62. In particular, the read-out sequence of the blocks addressed by the two groups alternates continuously.

Border blocks 1, 2 and 63, 64 at the left or/and right side of the pixel array are provided with all groups. In particular, they are supplied with two block select signals over two lines col_blk_sel_xx and are connected to both switch select buses sw_grp_a[1 ... 16] and sw_grp_b[1 ... 16]. If one of these border blocks is selected by col_blk_sel_xa then the switch select signal is taken from bus sw_grp_a[1 ... 16]. If one of these border blocks is selected by col_blk_sel_xb then the switch select signal is taken from bus sw_grp_b[1 ... 16]. In case an inner block B3 ... B62 is skipped the groups of addressing lines are selected in such a way that the read-out sequence is continuous across all blocks. This is shown in the FIGS. 7 to 10.

Each of the 16 read-out circuits comprises an amplifier AMP and is connected to the analogue-to-digital converter ADC by a multiplexing stage MUX. In particular, 16 wires transmitting the pixel information from each block B1 ... B64 are connected to the 16 wires of a pixel readout bus bar. Each of these bus bar wires serves as an input of an amplifier AMP. The outputs of the amplifiers AMP are multiplexed by multiplexing stage MUX, i.e. by means of a shift register that is fed with a '1' from clock signal mux_control once per 16 system clock cycles. So, finally each amplifier output is used periodically as input of the 12-bit analogue-to-digital converter ADC.

Figure 3:
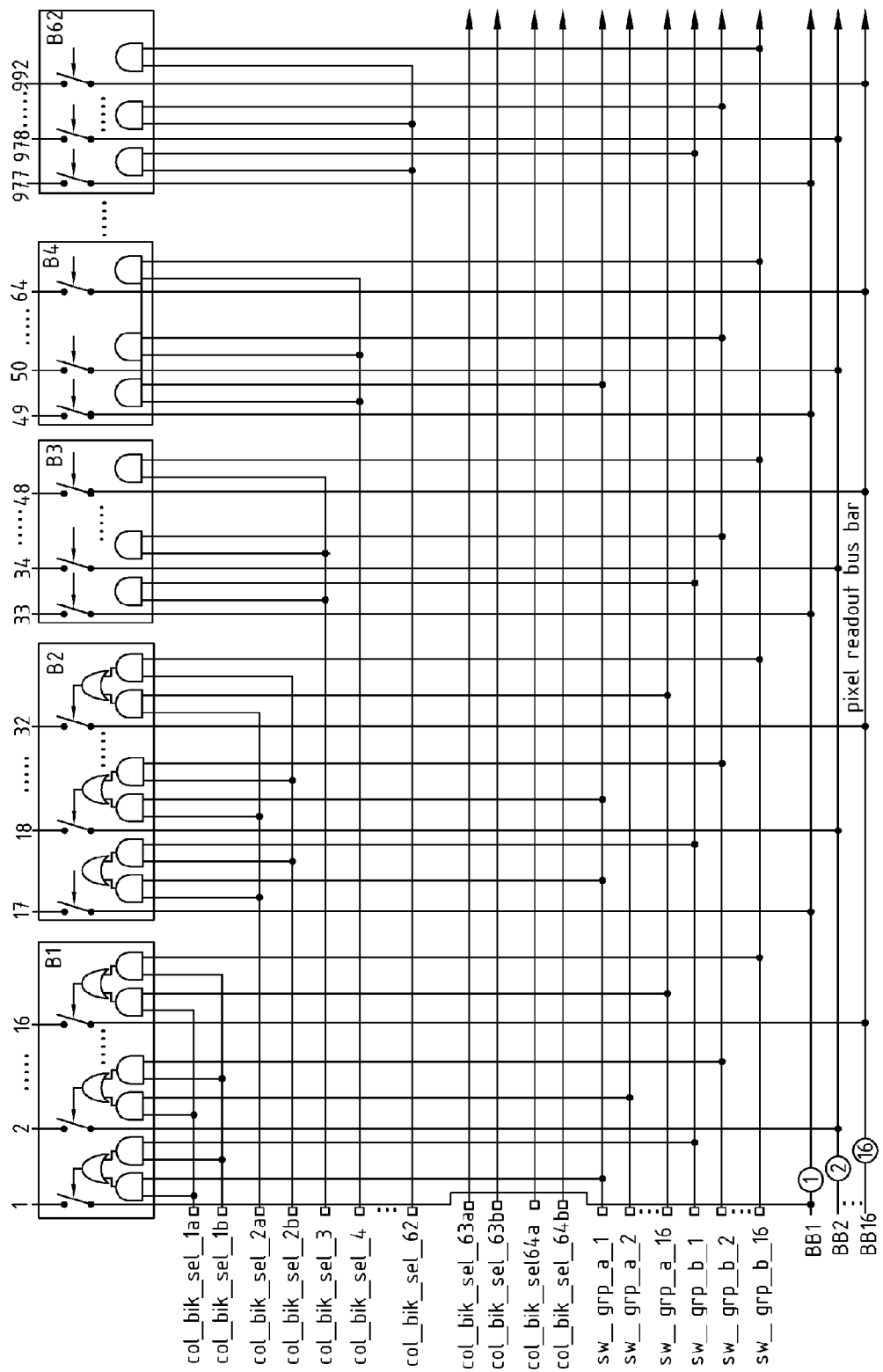
FIG. 3 a left part of FIG. 2 with details.
Figure 4:
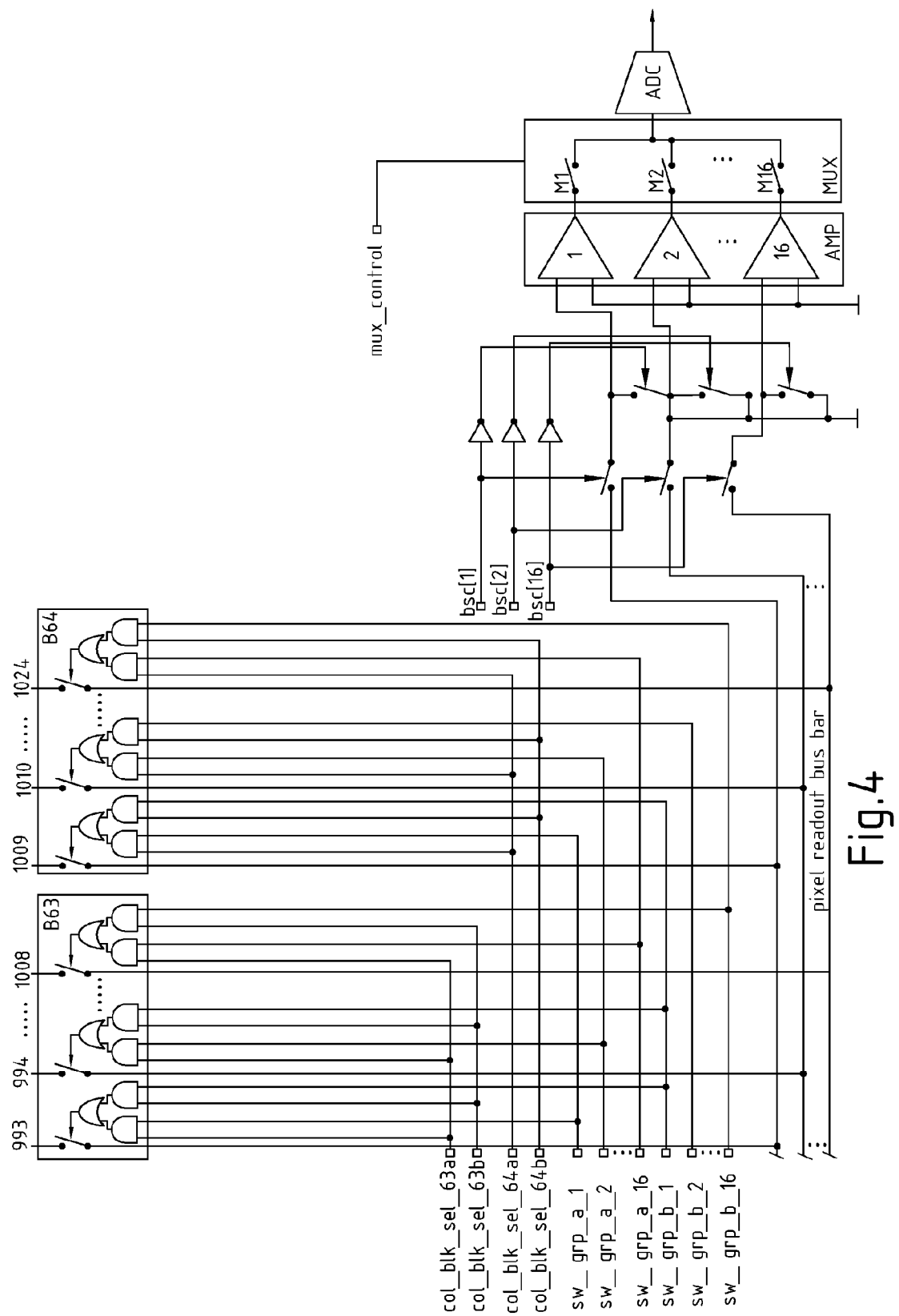
FIG. 4 a right part of FIG. 2 with details.

FIG. 3 shows the left side of the interface to the pixel array. FIG. 4 shows the right side of the interface to the pixel array and analogue signal processing. FIGS. 3 and 4 show the interface from the timing logic to the pixel array and the analogue signal processing in more detail. The interface to the pixel array comprises the read-out arrangement and the analogue signal processing comprises the column read out circuits.

The read out busbar bsc[1 ... 16] establish a connection either from the bus bar wires to the amplifier inputs or to GND during amplifier calibration.

Column read out signals are send to the analogue-to-digital converter ADC via the multiplexing stage MUX. In particular, for multiplexing the amplifier outputs the multiplexing stage MUX is provided, wherein a 16 stage shift register is combined with 16 analogue multiplexer switches M1 ... M16. The clock signal for the shift register comes from the same source as the clock for the analogue-to-digital converter ADC, i.e. the multiplexing stage MUX and the analogue-to-digital converter ADC are controlled by the common clock signal mux_control. With this architecture a single wire mux_control is sufficient to control this timing critical function between amplifiers AMP and the analogue-to-digital converter ADC.

The 1024 columns that are accessible at the top and the bottom of the pixel array respectively are grouped into 64 blocks of 16 pixels each. By means of registers that are controlled by a serial bus interface a selection of blocks to be read can be programmed. The border blocks B1, B2 at the left side of the pixel array and the border blocks B63, B64 at the right side of the pixel array are used for measurement and alignment purposes. The inner blocks B3 ... B62 comprise the active pixel area. The readout of the 4 border blocks B1, B2, B63, B64 and the inner blocks B3 ... B62 from the active area can be programmed independent from each other.

The 4 border blocks B1, B2, B63, B64 at the edges of the array are selected according to the following table:

| Register-Bits | Value | Function |
| --- | --- | --- |
| COL_BORDER[3] | 0 | skip block 1 |
|  | 1 | read block 1 |
| COL_BORDER[2] | 0 | skip block 2 |
|  | 1 | read block 2 |
| COL_BORDER[1] | 0 | skip block 63 |
|  | 1 | read block 63 |
| COL_BORDER[0] | 0 | skip block 64 |
|  | 1 | read block 64 |

The pixels from the active area are read out as a contiguous range of inner blocks defined by a number for the first and the last block to be read respectively. The number for the first inner block is determined by register COL_START[5 ... 0] and the number for the last inner block is determined by register COL_STOP[5 ... 0].

The number of the first inner block must be larger than 2 while the number of the last inner block must be smaller than 63. Furthermore the number of the first inner block must be less than or equal to the number of the inner last block. If one of these conditions is not met none of the blocks from the active area is accessed for reading but reading of the 4 border blocks, if selected, is not affected though.

Figure 5:
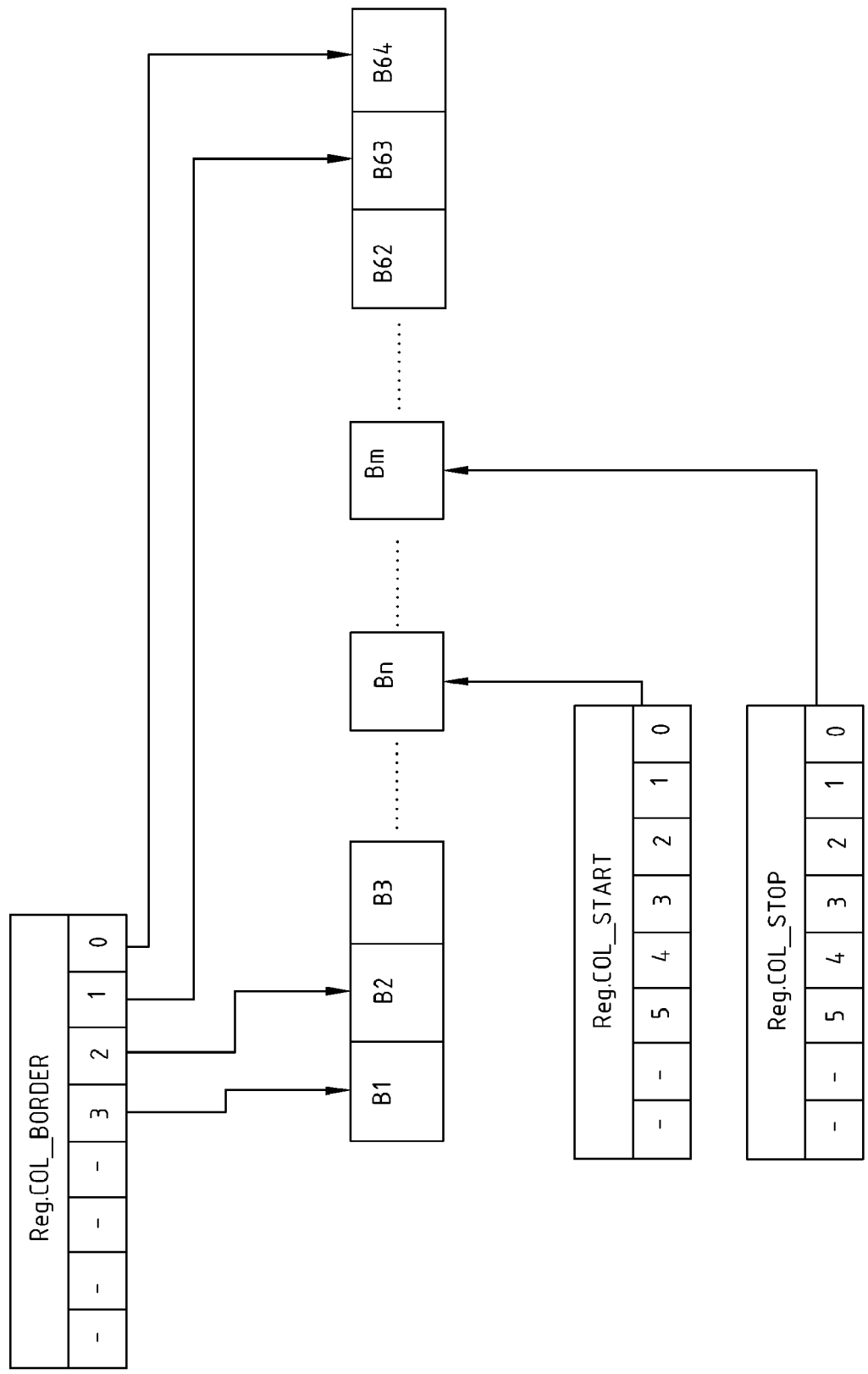
FIG. 5 an exemplary block diagram of the block readout addressing.
Figure 6:
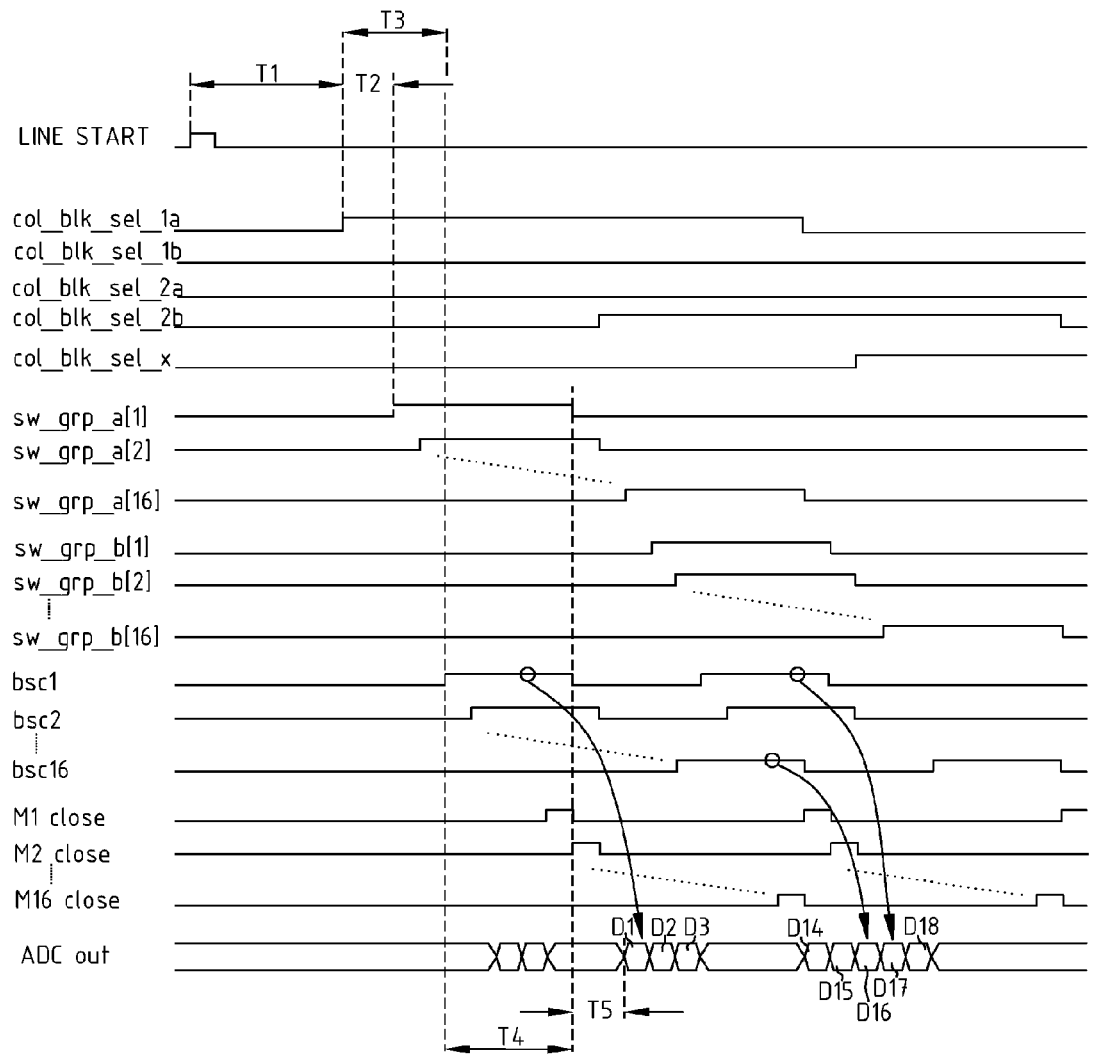
FIG. 6 a diagram of the signal timing during addressing blocks.

FIG. 5 shows an exemplary block diagram of the block readout addressing. FIG. 6 shows a diagram of the signal timing during addressing blocks. The timing of all important interface signals is shown in FIG. 6.

The depicted waveforms hold for an operational mode as follows:

Blocks B1 and B2 are selected for readout (left border blocks)

Start block from the active area is odd-numbered (represented by signal col_blk_sel_x)

If the mode settings differ from what is mentioned above the timing of following signals will be affected:

Block select signals col_blk_sel_1a{2a, 1b, 2b} for B1 and B2

Column select signals sw_grp_a[1 ... 16] and sw_grp_b[1 ... 16]

In FIG. 6 column select signals sw_grp_a[1 ... 16] are used first to address one from 16 columns within the selected block. Signals sw_grp_b[1 ... 16] are then used to address the columns in the following block. This order may be swapped depending on the selected readout configuration.

A pulse at pin LINE_START triggers pixel readout. A rising edge on this signal triggers the block select signal col_blk_sel_1a after a time T1.

After time T2 when this block was selected the first switch in block B1 is closed by means of signal sw_grp_a[1] to transfer pixel information from the first pixel in the row to busbar wire BB1, which is the first wire of the pixel readout busbar. This wire is connected to the input of the first amplifier AMP when busbar switch is closed. Switch closing is done by means of switch control signal bsc1 after time T3 when the block was selected.

Pixel information, provided by a sensor element from the array, is based on a specific amount of charge that depends on light intensity and exposure time on that element. Moreover, the pixel readout bus bar wires stretch across the whole width of the large pixel array and so they exhibit a significant capacitance. In order to guarantee an optimal charge settlement and to allow the amplifier output to stabilize the switch control signal bsc1 has to keep the busbar switch closed for time T4. At the end of this time period the multiplexer switch M1 is closed for 1 system clock period to transfer the amplifier output signal the input of the analogue-to-digital converter ADC. When this transfer is finished M1 is opened as well as the busbar switch controlled by bsc1 and switch controlled by sw_grp_a[1]. Finally after a processing delay T5 in the analog-to-digital converter ADC the digital value corresponding to the first pixel is available at the IC output.

As can be seen from FIG. 6 this procedure is applied consecutively to all remaining columns within selected block B1. This results in consecutive digital values D1 to D16 at the IC's output. Meanwhile similar control activities have been started on column block B2 with appropriate delay to provide a seamless data stream at the output D17, D18 . . . .

As can be seen from FIG. 6 the block select signal col_blk_sel_1a has to remain active as long as processing of the 16th pattern is not yet finished. For a continuous data stream at the output however it is necessary to load the busbar lines with charge from corresponding pixels of the next block as soon as the pixels from the preceding block have been processed. This requires an overlapped selection of consecutive blocks i.e. B2 selection with signal col_blk_sel_2b is activated in the center of the B1 selection period. For this reason a second group of column select signals sw_grp_b[1 . . . 16] is needed to address block B2 in parallel to block B1.

Figure 7:
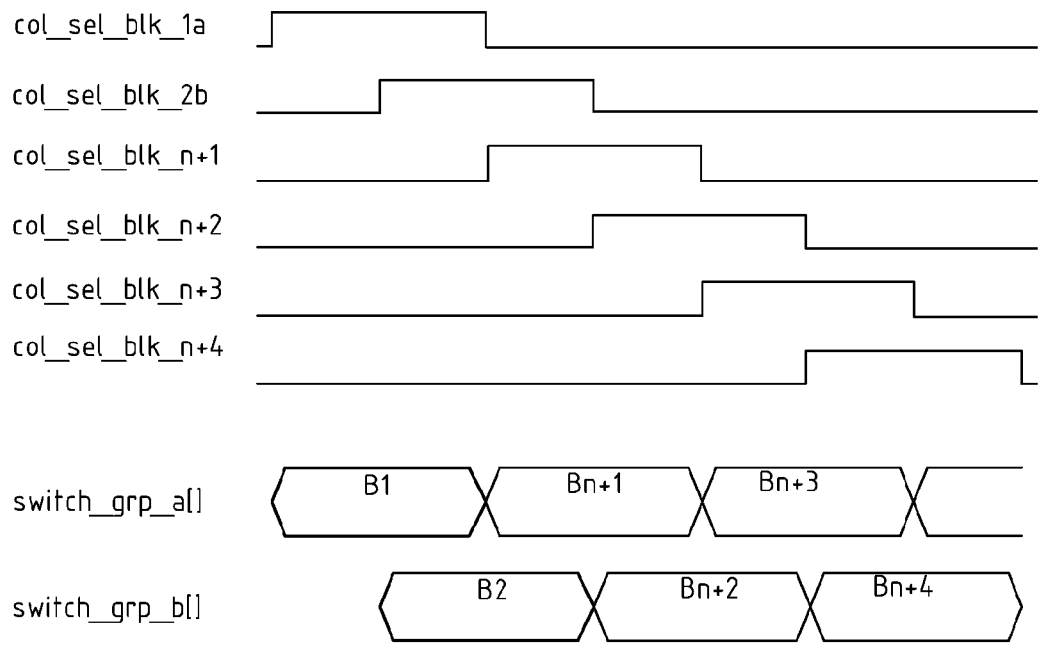
FIG. 7 to FIG. 10 compact diagrams of the signal timing during addressing of blocks.

A more compact way to illustrate the functional control of block accessing from FIG. 6 is shown with FIG. 7.

Here only the usage of block select signals col_blk_sel_XX and switch select groups sw_grp_a/b are shown to explain the idea of the invention.

Figure 8:
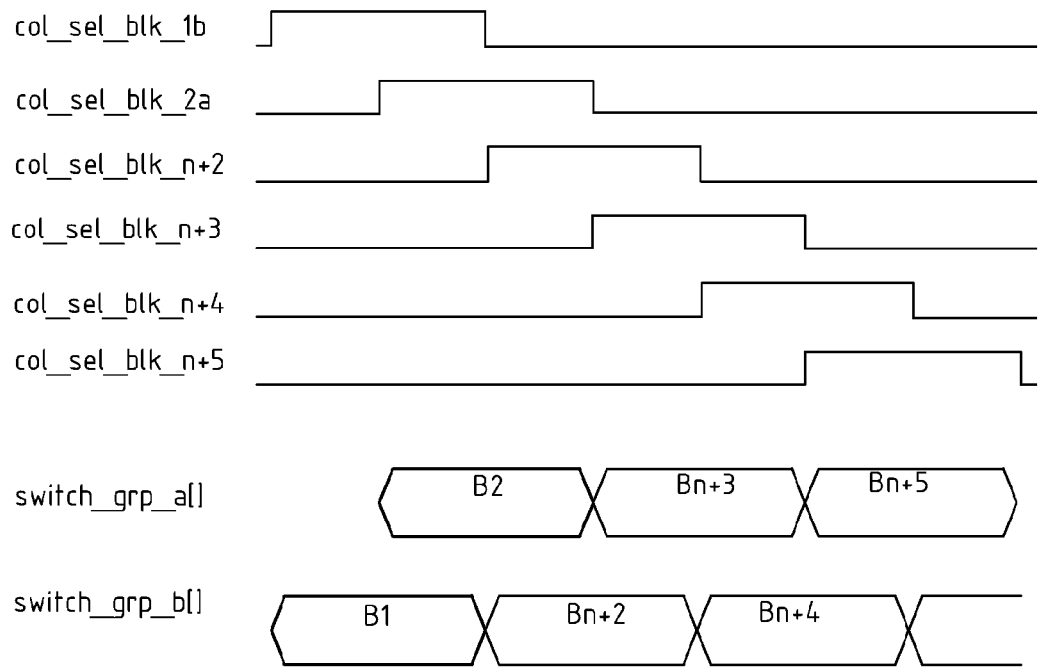
Figure 9:
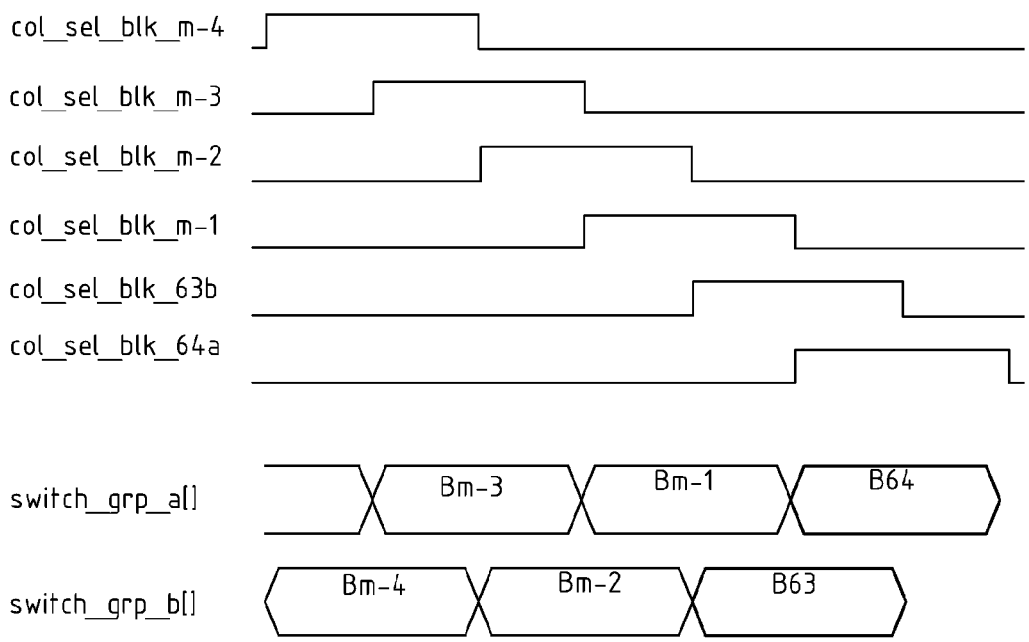

As mentioned above this example shows a case where both left border blocks B1 and B2 are to be read and then from the active pixel area a range of blocks, starting with a odd numbered block Bn+1 is to be read, where 2<=n<62 holds true. If the first block from the active pixel area would be an even numbered block the border blocks B1 and B2 would be selected with their other block select signals as shown in FIG. 8. Also the 16 switches within the border blocks would be controlled each with the other switch select group.

Up to now we have only discussed readout of blocks at the left side of the pixel array. At the right side of the array we will have similar situations as on the left side depending on last block to be read from the active pixel area. If this block has a odd number Bm−1, where 62>0 m>=4 holds true, and both border blocks at the right side are to b read than the readout control looks like FIG. 9 below.

Figure 10:
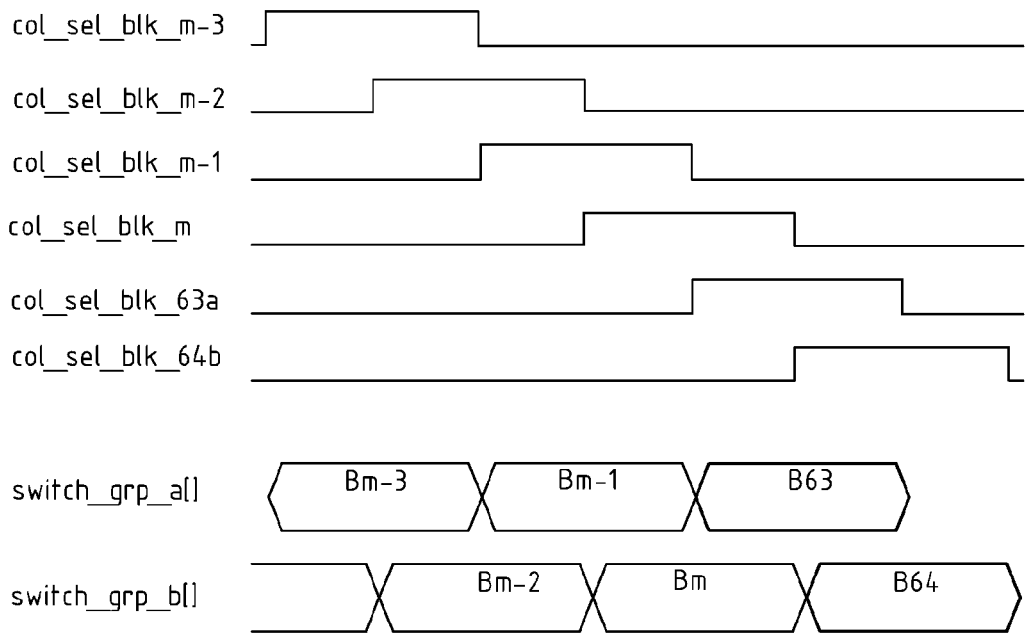

If the last block to be read would have an even number then readout control would look like as shown in FIG. 10.

With this control scheme any possible combination of blocks from the right and left border together with a programmable range from the active pixel area is selectable. This includes also a range of blocks from the active area without any border or vice versa.

List of reference symbols used in the drawing:

As mentioned above, the signal symbols are used for the signals and for the lines and buses, i.e. the wires.

| Signal | I/O | Description |
|---|---|---|
| SYS_CLK | I | System clock |
| LINE_START | I | Reference signal for start of readout timing (active high) |
| col_blk_sel_1a | O | Select signal A for column block 1 |
| col_blk_sel_1b | O | Select signal B for column block 1 |
| col_blk_sel_2a | O | Select signal A for column block 2 |
| col_blk_sel_2b | O | Select signal B for column block 2 |
| col_blk_sel[3 . . . 62] | O | Select signals for column blocks 3 to 62 |
| col_blk_sel_63a | O | Select signal A for column block 63 |
| col_blk_sel_63b | O | Select signal B for column block 63 |
| col_blk_sel_64a | O | Select signal A for column block 64 |
| col_blk_sel_64b | O | Select signal B for column block 64 |
| sw_grp_a[1 . . . 16] | O | Group A of signals to select one from 16 switches within a block |
| sw_grp_b[1 . . . 16] | O | Group B of signals to select one from 16 switches within a block |
| mux_control | O | Input for pixel data bus bar selection shift register |
| bsc[1 . . . 16] | O | Busbar select control signals |

| Register-Name | Description |
|---|---|
| COL_BORDER[3 . . . 0] | Determines whether or not blocks 1, 2, 63, 64 are to be read |
| COL_START[5 . . . 0] | First block from contiguous main field readout range |
| COL_STOP[5 . . . 0] | Last block from contiguous main field readout range |

A method for reading out pixels of an image sensor according to a second embodiment of the invention is illustrated in the FIGS. 11 to 14b. The method for reading out pixels of the image sensor according to the invention is used for removing defective pixels.

Figure 11:
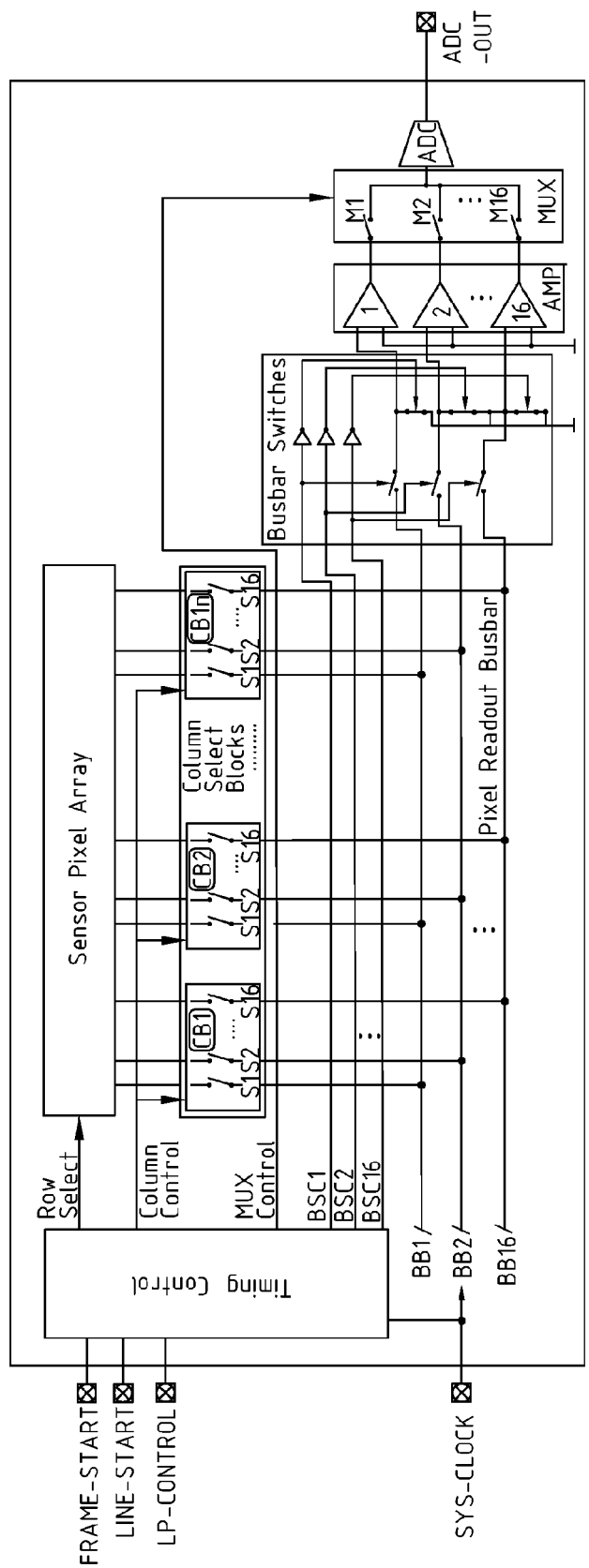
FIG. 11 and exemplary block diagram of an image sensor with a read-out arrangement of a second embodiment of the invention.

A block diagram of a CMOS image sensor IC is shown in FIG. 11. The sensor pixel array, comprising the light sensitive elements, is controlled by a digital timing control block, i.e. a timing controller, which organizes access to rows and columns of the array. Row addressing does not refer to the invention since it only prepares access to individual pixel content by selecting a row from the array. The final access to pixels is then controlled by column access logic. In particular, in the method the pixels arranged as the pixel array with the rows and the columns are read out row by row with a read-out arrangement.

The number of columns of an imager array with high resolution is generally large so it is not feasible to provide a column read out circuit with a dedicated amplifier for each column. Rather, a hierarchical access control is implemented to allow for the number P of the column read out circuits and of amplifiers AMP to be limited to e.g. 16 in our case. This is achieved by dividing a row into blocks CB1 to CBn, each with 16 columns. The 16 columns of e.g. selected blocks CB1 . . . CBn are read out by the 16 column read out circuits.

A specific column is selected by addressing one of the blocks and one of the columns using addressing lines, such as block select lines or lines for the switches S1 to S16. A specific column is selected by first selecting one of the blocks and then by closing on of the switches S1 to S16 within the selected block.

The outputs of the columns of the selected blocks, i.e. the outputs of all column select blocks shown in FIG. 11, are routed to the column read out circuits, in particular to a common 16 wire pixel readout bus bar that eventually feeds the inputs of 16 pixel amplifiers AMP after passing a bus bar switches block. The amplifier outputs are then multiplexed by a multiplexing stage MUX to an analogue-to-digital converter ADC which generates the final output of the imager IC.

The bus bar switches block together with the control signals BSC1 to BSC16 constitutes a central element of the reading out process.

Figure 12:
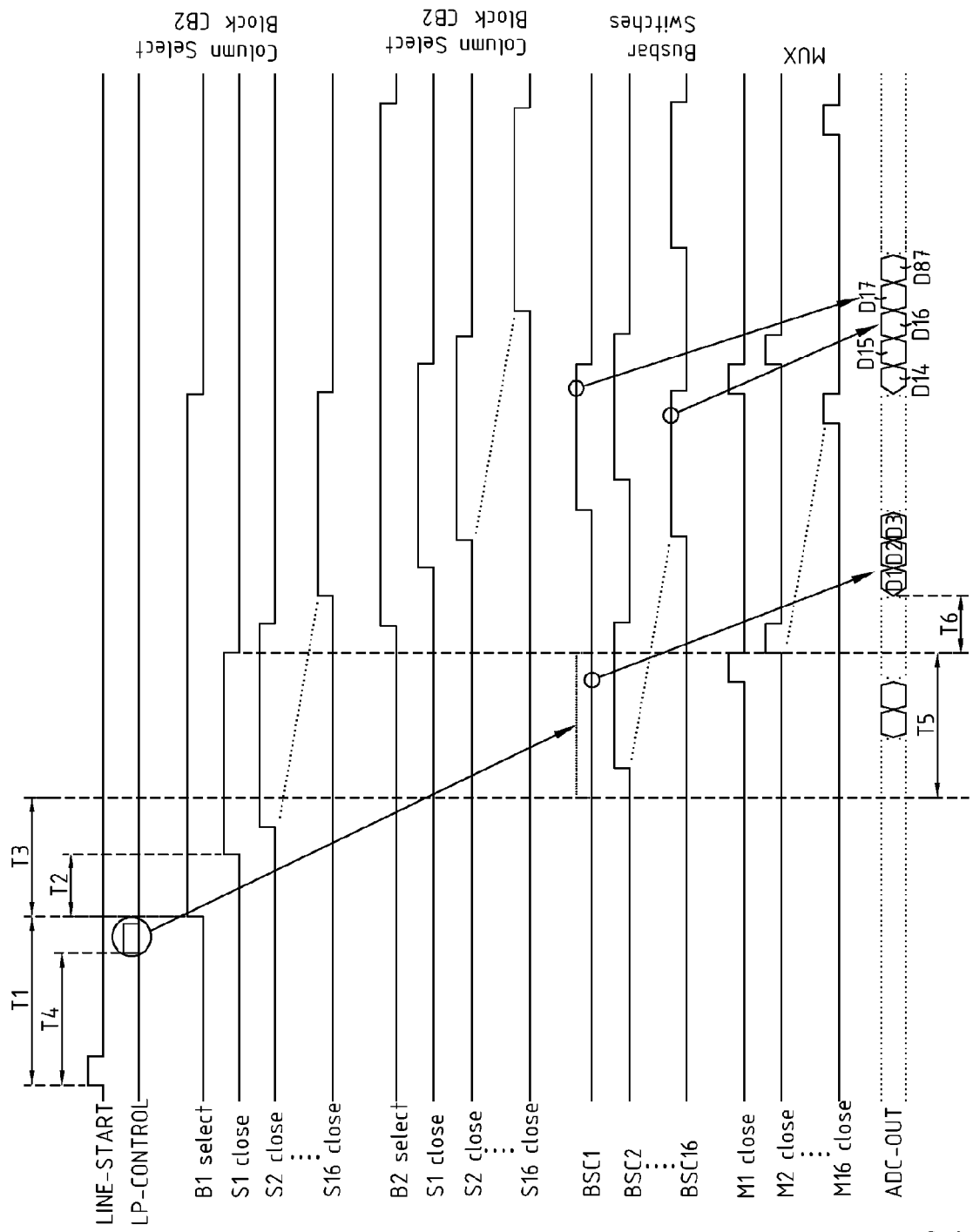
FIG. 12 a diagram of the signal timing during reading out.

The access to pixels in a row is exemplified by FIG. 12. The control functions are based on synchronous circuits implemented in the timing control block and initiated by the external signal LINE-START. A rising edge on this signal triggers the block select signal CB1 after a time T1. After time T2 when this block CB1 was selected the first column of the block CB1 is addressed. In particular, the first switch S1 is closed to transfer pixel information from the first pixel in the row to bus bar wire BSC1. This wire is connected to the input of the first amplifier when bus bar switch BSC1 is closed. Switch closing is done by means of switch control signal BSC1 after time T3 when the block was selected as depicted by the dotted line on BSC1 signal.

Pixel information, provided by a sensor element from the array, is based on a specific amount of charge that depends on light intensity and exposure time on that element. Moreover, the pixel readout bus bar wires stretch across the whole width of the large pixel array and so they exhibit a significant capacitance. In order to guarantee an optimal charge settlement and to allow the amplifier output to stabilize the switch control signal BSC1 has to keep the bus bar switch closed for time T5. At the end of this time period the multiplexer switch M1 is closed for 1 system clock period to transfer the amplifier output signal to the input of the analogue-to-digital converter ADC. When this transfer is finished the multiplexer switch M1 is opened as well as the bus bar switch controlled by BSC1 and switch S1. Finally after a processing delay T6 in the analogue-to-digital converter ADC the digital value corresponding to the first pixel is available at the IC output.

As can be seen from FIG. 12 this procedure is applied consecutively to all remaining columns within column select block CB1. This results in consecutive digital values D1 to D16 at the IC's output. Meanwhile similar control activities have been started on column block CB2 with appropriate delay to provide a seamless data stream at the output (D17, D18 ... ).

The description above refers to a pixel readout procedure where no leaking pixel has to be corrected. In case the pixel of a column is defective a column read out signal with a value provided by the defective pixel is replaced by a predetermined value while reading out the columns by the column read out circuits. The replacement is described in detail in the following.

We assume that the first pixel in a row (column 1) is damaged and should be replaced by a predetermined value, namely a value corresponding to a black pixel. First of all this situation has to be detected during a setup procedure in an application unit (e.g. camera) which pinpoints damaged pixels on the built-in image sensor. Then during normal operation of the device when it comes to addressing a row containing this damaged pixel in the first column a control signal, namely a signal LP-CONTROL, has to be applied for one system clock cycle after time T4 when signal LINE-START has been applied. This pulse is processed in the timing control block. As a result signal BSC1 will not establish the connection of bus bar line 1 to the amplifier input (signal BSC1 during T5 in FIG. 12) but keeps this input tied to GND which results in an amplifier output according to a black pixel.

As a preferred alternative of the embodiment of the invention, positions of defective pixels are stored in a map holding information corresponding to each pixel of the imager chip. The map may be read out in parallel to addressing the imager chip, thereby the information about defective pixel is immediately available when addressing the individual pixels of the imager. The map may be a binary storage, e.g. a memory, in which binary signals indicating a defective or a functional pixel are stored.

If the signal pulse LP-CONTROL would be shifted by one clock cycle to the right the second pixel would be replaced and so on. If the pulse width of the signal would be more than one clock cycle a consecutive number of pixels would be replaced according to the width of the signal LP-CONTROL.

Basically any number of defective pixels within a selected row can be replaced by black pixels but of course defined quality rules will limit the allowed number of defects on a pixel array.

Instead of replacing a defective pixel by a value corresponding to a black pixel it is also possible to replace the defective pixel by a value corresponding to one of the neighbouring pixels.

Figure 13:
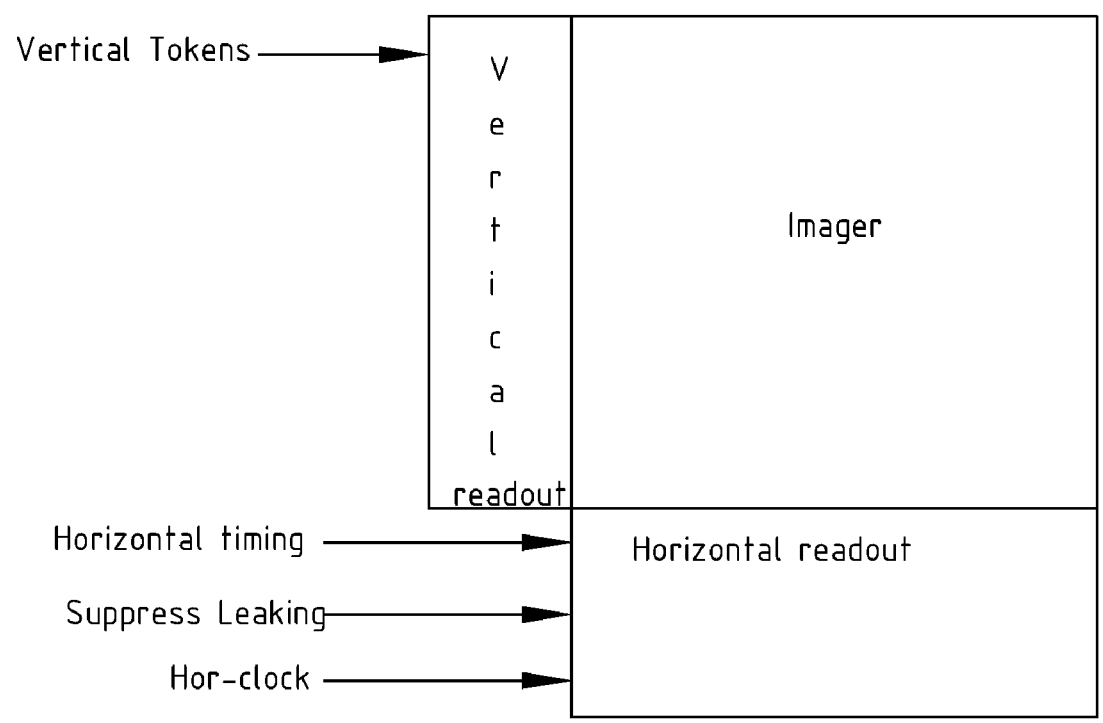
FIG. 13 a simplified schematic block diagram of the image sensor.

FIG. 13 shows a simplified schematic block diagram of the imager according to the invention. Vertical addressing, or line addressing, is performed by a corresponding addressing circuitry. For example, vertical tokens corresponding to a binary pattern are passed through a shift register. The horizontal readout is performed in a similar way by a horizontal addressing circuitry. Further to known components for horizontal readout and the corresponding signals for horizontal timing and pixel clock a signal for suppressing leaking pixels is supplied. The signal for suppressing leaking pixels is synchronised with the horizontal timing and pixel clock. As a result, the control signal, namely the signal LP-CONTROL, which selects between reading the actual value from the pixel or replacing the value by the predetermined value, is in synchronism with the addressing signals.

Figure 14A:
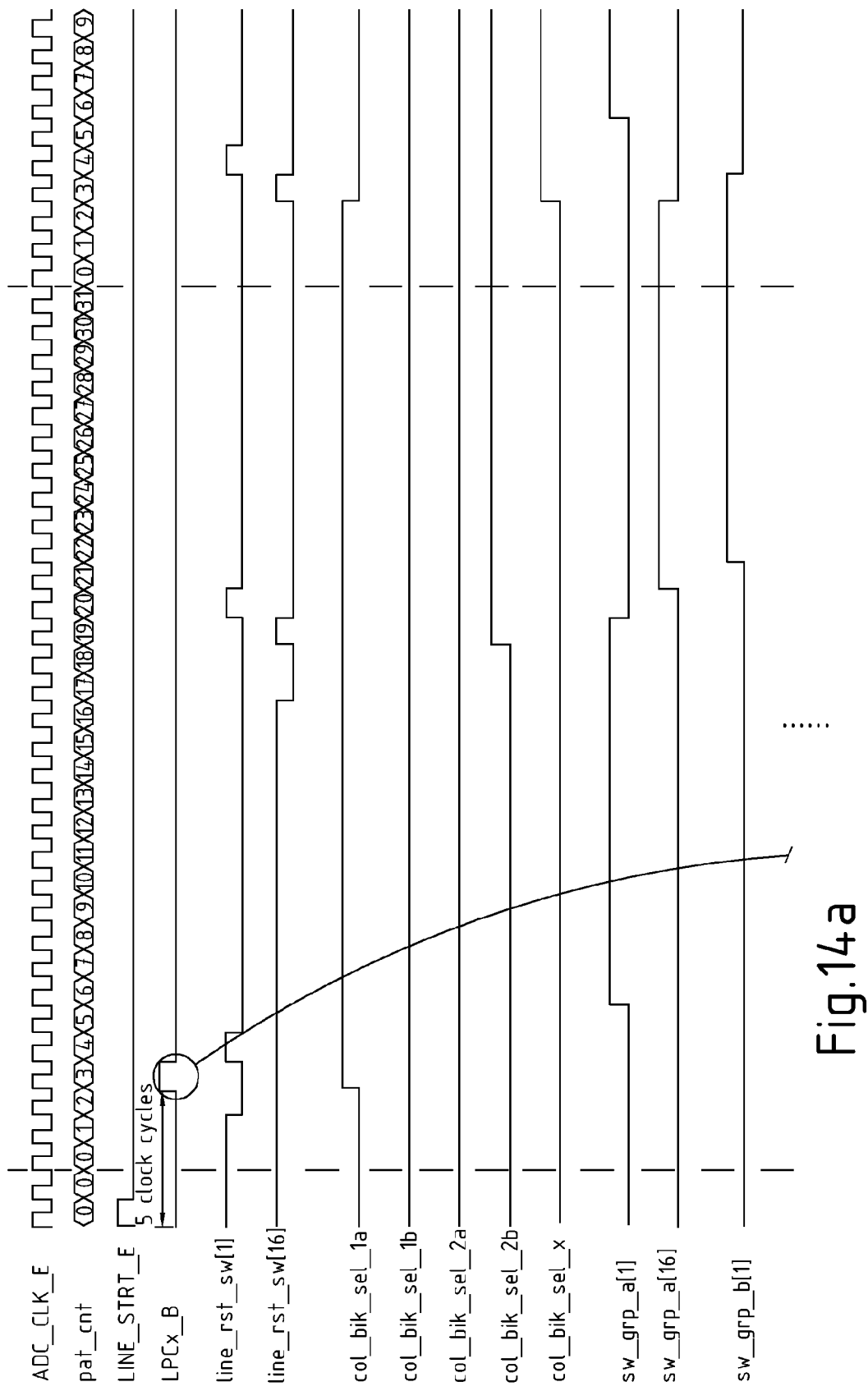
FIGS. 14a and 14b two parts of a diagram of signal timing during replacing a defective pixel.
Figure 14B:
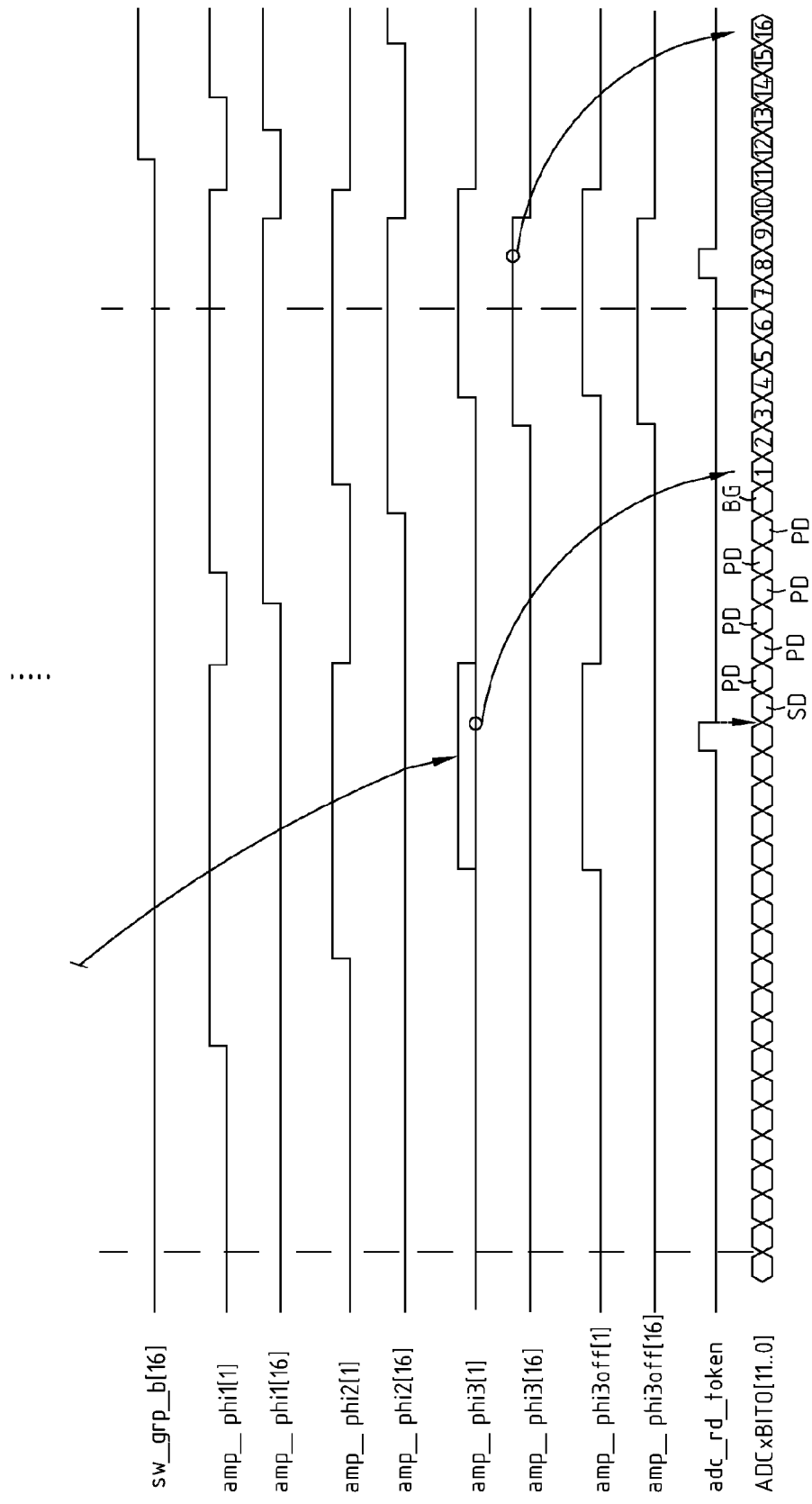

FIG. 14 shows an additional example for leaking pixel replacement in a method for reading out pixels of an imager sensor. This method shown in FIG. 4 is similar to the method of the first embodiment shown in FIG. 6. As a result, the method shown in FIG. 14 combines a method, wherein the blocks are selectively addressed by two different groups of addressing lines sw_grp_a[1 ... 16] and sw_grp_b[1 ... 16] with a method with a replacing of a value of a defective pixel with a predetermined value in the analogue domain. The control signal is mentioned as LPCx_B in FIG. 14.

The simple case that the first pixel within a row is to be replaced is shown so that this example can be used as a reference to determine the timing of the external control signal for a particular pixel. As already mentioned it is implied that the programmable delay from register HD_DLY is set to zero.

Basically any number of defective pixels within a selected row can be replaced by black pixels but of course defined quality rules will limit the allowed number of defects on a pixel array.

In order to replace the first pixel under these conditions a pulse of one clock cycle width has to be applied to pin LPCx_B 5 clock cycles after the rising edge of signal LINE_STRT_E. As a result signal amp_phi3[1] will not establish the connection of bus bar line 1 to the amplifier input but tie this input to GND. The reference input of the amplifier AMP is switched to the external source as in normal operation which results in an amplifier output according to a black pixel.

If the pulse at pin LPCx_B is shifted by one clock cycle to the right the second pixel will be replaced and so on. If the pulse width of the signal is more than one clock cycle a consecutive number of pixels will be replaced according to the width of the signal at pin LPCx_B.

If the programmable delay from register HD_DLY is not set to zero this delay has to be considered in the calculation of the point in time for the pulse at pin LPCx_B.

The invention claimed is:

1. Image sensor comprising:
   a plurality of pixels arranged as a pixel array with rows and columns and at least one read-out arrangement for reading out the pixels row by row,
   wherein the columns are grouped into blocks with a certain number P of columns,
   wherein each read-out arrangement comprises P column read out circuits and an addressing circuit with at least two groups of addressing lines for addressing the blocks,
   wherein the blocks are selectively addressed by the groups of addressing lines, and
   wherein the groups of addressing lines enable control activities on a consecutive block of a block while control activities on this block are continued, in a way that a read-out sequence of blocks addressed by the groups is continuous across all blocks, wherein a seamless data stream at an output is provided.

2. Image sensor according to claim 1, wherein border blocks at the left or right side of the pixel array are provided with addressing lines of all groups, wherein in case an inner adjacent to a border block is skipped or a range of inner blocks is selected, the groups of the addressing lines for the border blocks are selected in such a way that the read-out sequence is continuous across all border and inner blocks.

3. Image sensor according to claim 1, wherein the P column read out circuits are connected to one analogue-to-digital converter via a multiplexing stage, wherein the multiplexing stage and the analogue-to-digital converter (ADC) are controlled by a common clock signal.

4. Method for reading out pixels of an image sensor including the steps of,
   reading out at least a part of the pixels that are arranged as a pixel array with rows and columns in a row by row fashion with a read-out arrangement,
   reading out columns out of blocks of columns each block having P columns by means of P column read out circuits,
   selectively addressing at least two blocks by corresponding groups of addressing signals wherein the groups of addressing signals enable control activities on a consecutive block of a first block, while control activities on the first block are continued, in such a way that a read-out sequence of the blocks addressed by the groups is continuous across all blocks and wherein a seamless data stream at an output is provided.

5. Method for reading out pixels of an image sensor according to claim 4, wherein border blocks at the left or right side of the pixel array are selectively addressed by selected addressing signals out of all groups of addressing signals, wherein in case a inner block adjacent to a border block is skipped, or a range of inner blocks is selected, the groups of addressing signals for the border blocks are selected in such a way that the read-out sequence is continuous across all border and inner blocks.

6. Method for reading out pixels of an imager sensor according to claim 4, wherein column read out signals are send to one analogue-to-digital converter via a multiplexing stage, wherein the multiplexing stage and the analogue-to-digital converter are controlled by a common clock signal.

7. Method for reading out pixels of an imager sensor claim 4, wherein a column read out signal with a value provided by a defective pixel is replaced by a predetermined value while reading out the P columns by the P column read out circuits.

* * * * *